(12) United States Patent
Kawai

(10) Patent No.: US 6,801,829 B2
(45) Date of Patent: Oct. 5, 2004

(54) KEY INFORMATION REGISTRATION PROCEDURE ASSISTING SYSTEM, RECORDED MEDIUM, AND KEY PLATE CUTTER

(75) Inventor: Masaji Kawai, Yokohama (JP)

(73) Assignee: Kawai Shokai Kabushiki Kaisha, Yokohama (JP)

( * ) Notice: Subject to any disclaimer, the term of this patent is extended or adjusted under 35 U.S.C. 154(b) by 50 days.

(21) Appl. No.: 10/239,341
(22) PCT Filed: Mar. 21, 2001
(86) PCT No.: PCT/JP01/02218
§ 371 (c)(1), (2), (4) Date: Jan. 16, 2003
(87) PCT Pub. No.: WO01/71129
PCT Pub. Date: Sep. 27, 2001

(65) Prior Publication Data
US 2003/0144759 A1 Jul. 31, 2003

(30) Foreign Application Priority Data
Mar. 23, 2000 (JP) ........................................ 2000-081425

(51) Int. Cl.[7] .............................................. G06F 19/00
(52) U.S. Cl. .................................................... 700/161
(58) Field of Search ............................. 700/161; 409/81

(56) References Cited

U.S. PATENT DOCUMENTS

| | | | | |
|---|---|---|---|---|
| 5,617,323 A | * | 4/1997 | Stansberry et al. | 700/161 |
| 5,676,504 A | * | 10/1997 | Mueller et al. | 409/83 |
| 5,711,643 A | * | 1/1998 | Parr et al. | 409/83 |
| 6,647,308 B1 | * | 11/2003 | Prejean | 700/117 |

FOREIGN PATENT DOCUMENTS

| | | | | |
|---|---|---|---|---|
| JP | 4-19007 | 1/1992 | ............. | B23C/3/35 |
| JP | 11-104935 | 4/1999 | ............. | B23Q/15/00 |

* cited by examiner

Primary Examiner—Leo Picard
Assistant Examiner—Elliot Frank
(74) Attorney, Agent, or Firm—Antonelli, Terry, Stout & Kraus, LLP

(57) ABSTRACT

The key plate image (141), a guide lines (142) and (143) for specifying the position and the depth of cutting a key groove is formed, and the shape of a key groove (144) are displayed on a Web screen. Then, instructions about the shape of a key groove and the area where the key groove is formed are received in order so as to create an image of the key to be registered. The information of the key is related to the information for identifying the user and stored. Thus, the registration procedure necessary to make a key can be performed easily.

8 Claims, 12 Drawing Sheets ical field

The present invention relates to a technique for supporting a registration procedure of information necessary to make a key.

BACKGROUND OF ART

Many kinds of keys are used in the modern society such as for houses, rooms, safes, cases, cars, machines, and the like whether we like it or not. Therefore, when a key is lost, inconvenience can occur inevitably such that we cannot enter a room, open a safe, get in a car, and operate a machine.

DISCLOSURE OF INVENTION

In this respect, as the conventional countermeasure, arrival of a person who has a duplicate key is waited for or a service company about a key is called to have the key unlocked or destroyed depending on the situation.

However, in case of waiting for a person having a duplicate key, generally it takes unexpected time and it maybe often imprecision. While, in case of calling a service company, it costs a great deal. Furthermore, in case of having a key destroyed, there is a problem of fixing a new key.

To avoid the above problems, it would be convenient to previously register the information necessary to make a key somewhere in case of losing a key and, if necessary, and ask for manufacture of the duplicate key based on the information. However, a key has a complicated shape and it is very difficult for general public to identify a key. Therefore, it is hard to convey properly the information necessary to make a key to a key manufacturer. Further, it would be troublesome and inconvenient to carry a key and visit a key manufacturer in order to register the information of the key. Therefore, it is expected to develop a system capable of registering the information necessary to make a key easily by using a personal computer at home and the like.

An object of the present invention is to provide a technique for supporting the information registration procedure necessary to make a key, in order to perform the same at ease.

In order to solve the above problem, a system for supporting the registration procedure of the information necessary to make a key, according to the present invention, is characterized by comprising: means for storing image data for key information input including an image indicating a shape of a key plate, an area display image indicating an area where a key groove concerned about the shape needs to be formed, and a key groove shape display image indicating a plurality of key groove shapes, in relation to key plate specification information for specifying the shape of the key plate; means for accepting an input of the key plate specification information for specifying a key plate; means for retrieving the image data for key information input about a key plate specified by the accepted the key plate specification information; means for outputting the image data for key information input found by the above retrieval; and means for accepting an input of information including a specified key groove shape indicated by the key groove shape display image and a specified area indicated by the area display image, as for the supplied image data for key information input.

BEST MODE FOR CARRYING OUT THE INVENTION

An embodiment of the present invention will be described in details with reference to the drawings hereafter.

In the embodiment, a server computer working as a key information registration system to support registration procedure of key information is connected to a terminal computer performing the registration procedure of the key information through a network, for example, the Internet. A user enters the key information necessary to make a key, according to an instruction of a Web page provided by the key information registration system, which is displayed on the terminal computer. The key information registration system registers this information related with the user's identification information.

In this way, the key information registration system can perform the processing for supporting input of the information necessary to make a key and the processing for receiving the key information and registering the information related with the user's identification information.

In general, a key can be identified by the type of the key, the shape of the key plate, and the key groove pattern carved on the keyplate. Therefore, the information related to the above is at least included in the key information to be registered in the key information registration system. Of the above, the type of a key can be specified by the use of the key, such as a key used for car, house, and the like. The shape of a key plate can be specified by the key plate maker and the combination of numbers carved on the key. Of course, it can be specified also by comparison between the actual key plate and the key plate sample.

The key groove means a cut for forming the outline of a key plate and a key is made by cutting a plurality of key groove portions from a predetermined key plate. The shape of a key groove includes triangle, square, trapezoid, semicircle, and the like. These shapes are further associated with the carved position and depth. The key groove patterns are formed by various combinations of the respective key grooves.

Figure 1:
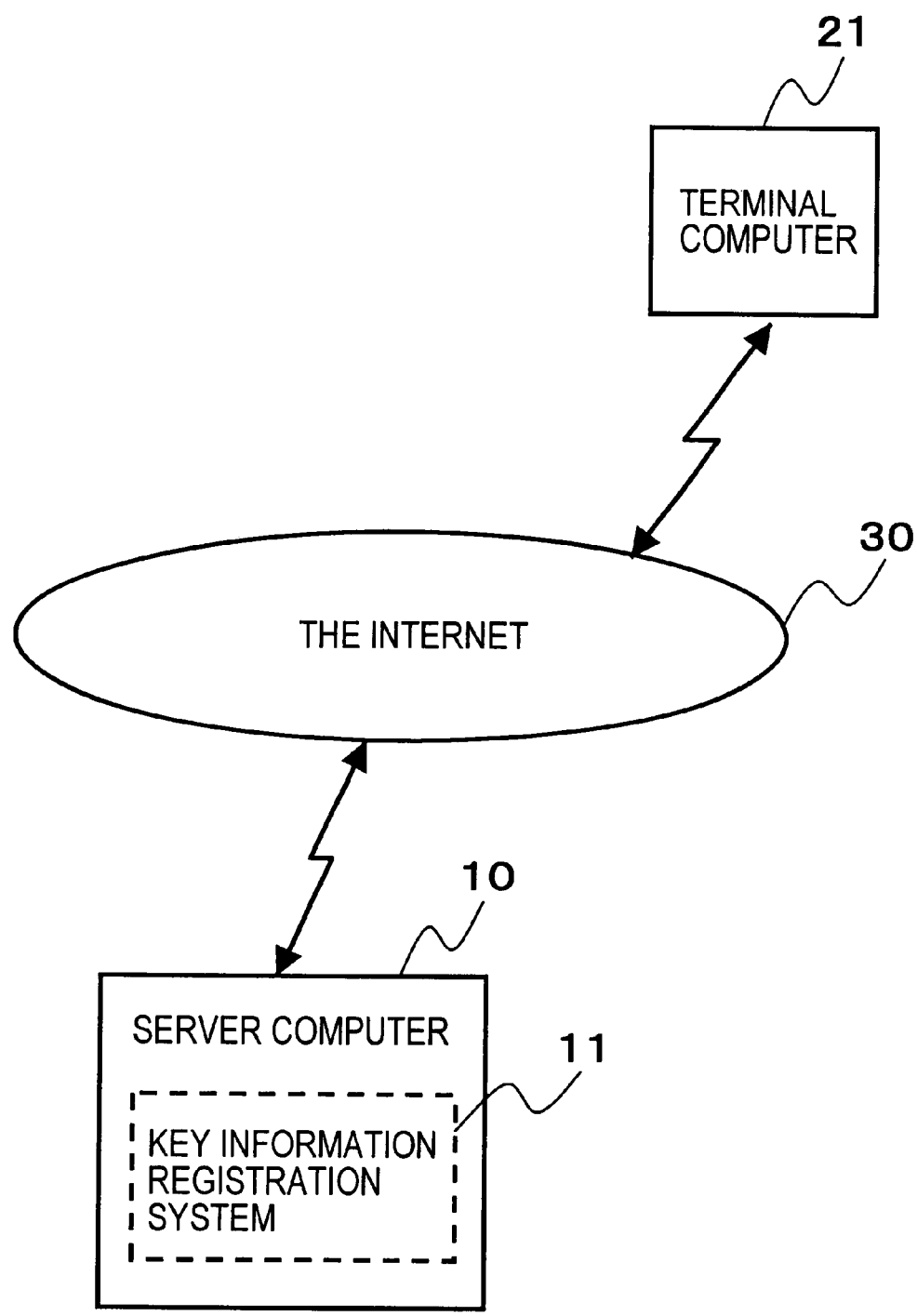
FIG. 1 is a block diagram for explaining the outline of a system to which the present invention is applied.

FIG. 1 is a block diagram for explaining the outline of the system to which the present invention is applied. In this figure, a server computer 10 forms a key information registration system 11. The server computer 10 is connected to the Internet 30 through a telephone line and the like.

A plurality of terminal computers 21 are connected to the Internet 30 through a telephone line and the like (only one terminal computer is shown in this figure). A user can gain access to the Internet 30, by using his or her usable terminal computer 21.

Figure 2:
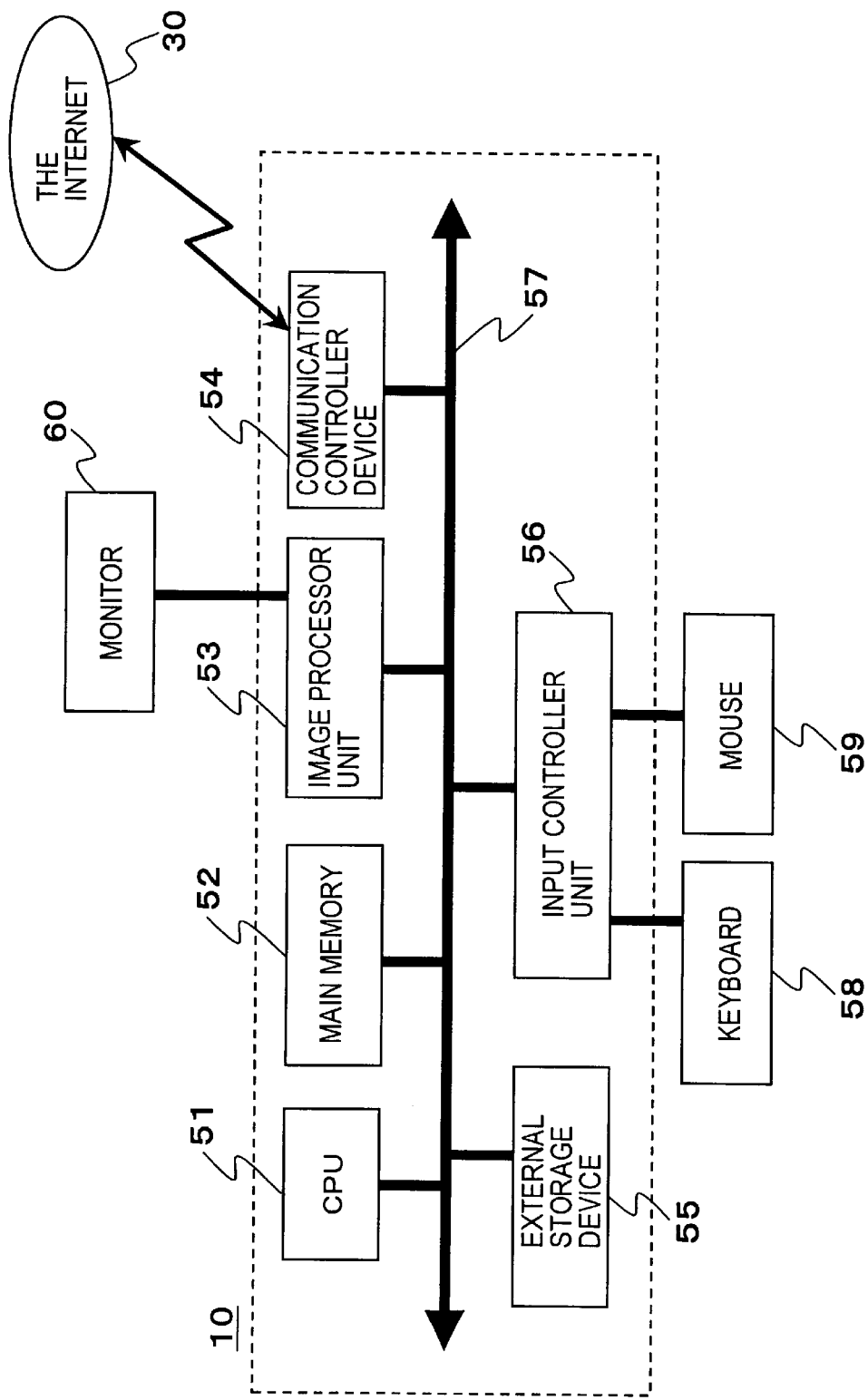
FIG. 2 is a block diagram for explaining the hardware structure of a computer.

The server computer 10 can be formed, for example, by using a hardware system as shown in FIG. 2. In this figure, the server computer 10 comprises a central processing unit (CPU) 51, a main memory 52, an image processor unit 53, a communication controller device 54, an external storage device 55, an input controller unit 56, and a system bus 57 for connecting these devices.

The server computer 10 is connected to a keyboard 58 and a mouse 59 through the input controller unit 56. Further, the server computer 10 is connected to a monitor 60 that is an image output device through the image processor unit 53. In addition, it is connected to the Internet through the communication controller device 54. It is needless to say that the structure of the server computer 10 is not limited to this.

The CPU 51 is a device for performing a main control in the server computer 10, provided with a function of reading and executing a program. The main memory 52 is provided with a function of temporarily storing the data, program, and the like which the server computer 10 handles. The image processor unit 53 conducts calculation and the like for creating images. The communication controller device 54 is formed by, for example, modem, TA, and the like and it controls the data transmission and reception through a network. The external storage device 55 is formed by, for example, a hard disk and the like, where basic software, application software, and the other various data are stored in a non-volatile way. The input controller unit 56 performs the data control when accepting an operator's instruction.

Figure 3:
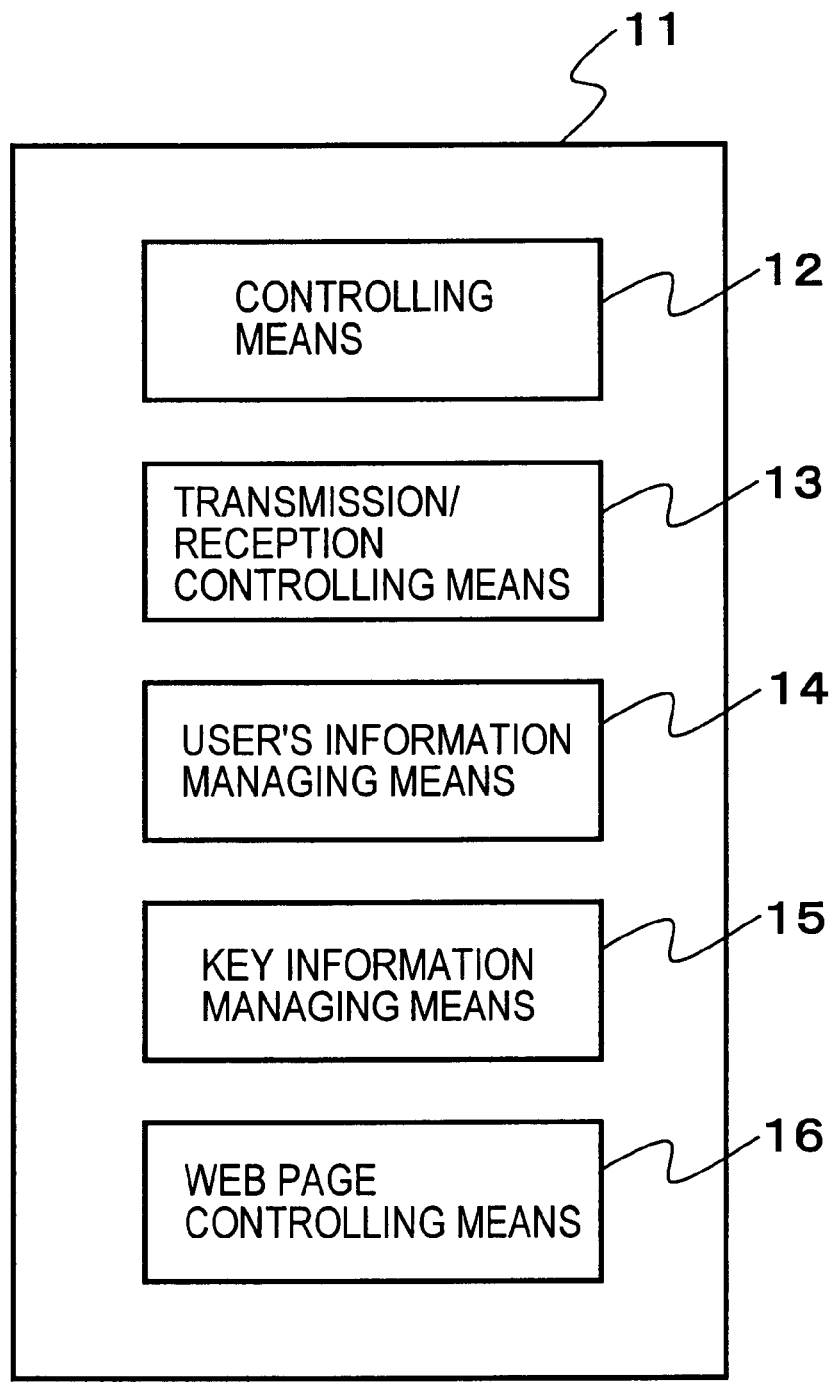
FIG. 3 is a block diagram showing an example of the functional structure of a key information registration system.

FIG. 3 is a block diagram showing an example of the functional structure of the key information registration system 11. The key information registration system 11 comprises controlling means 12, transmission/reception controlling means 13, user's information managing means 14, key information managing means 15, and Web page controlling means 16. These functions are realized by the operation in cooperation with the above hardware systems. However, these functions may be dispersed into a plurality of computers.

The controlling means 12 is realized by the CPU 51 and the like executing an instruction stored in the main memory 52, and the like, and it serves a function of controlling the respective means of the key information registration system 11. The transmission/repletion controlling means 13 performs the transmission/reception control of data to/from the terminal computer 21 connected through the Internet 30. The user's information managing means 14 registers the personal information of a user who has registered the key information together with the information of the registered key. The key information managing means 15 manages data of the shape of key plate and the like. The Web page controlling means 16 controls the Web page to be displayed on the monitor 60 of the terminal computer 21.

Next, the terminal computer 21 will be described. The terminal computer 21 may be formed by using the hardware systems as shown in FIG. 2, similarly to the server computer 10. Further, it may be provided with a printing machine such as a printer, an auxiliary storage such as a magnetic disk drive, and the like. It is needless to say that it is not restricted to this structure.

Figure 4:
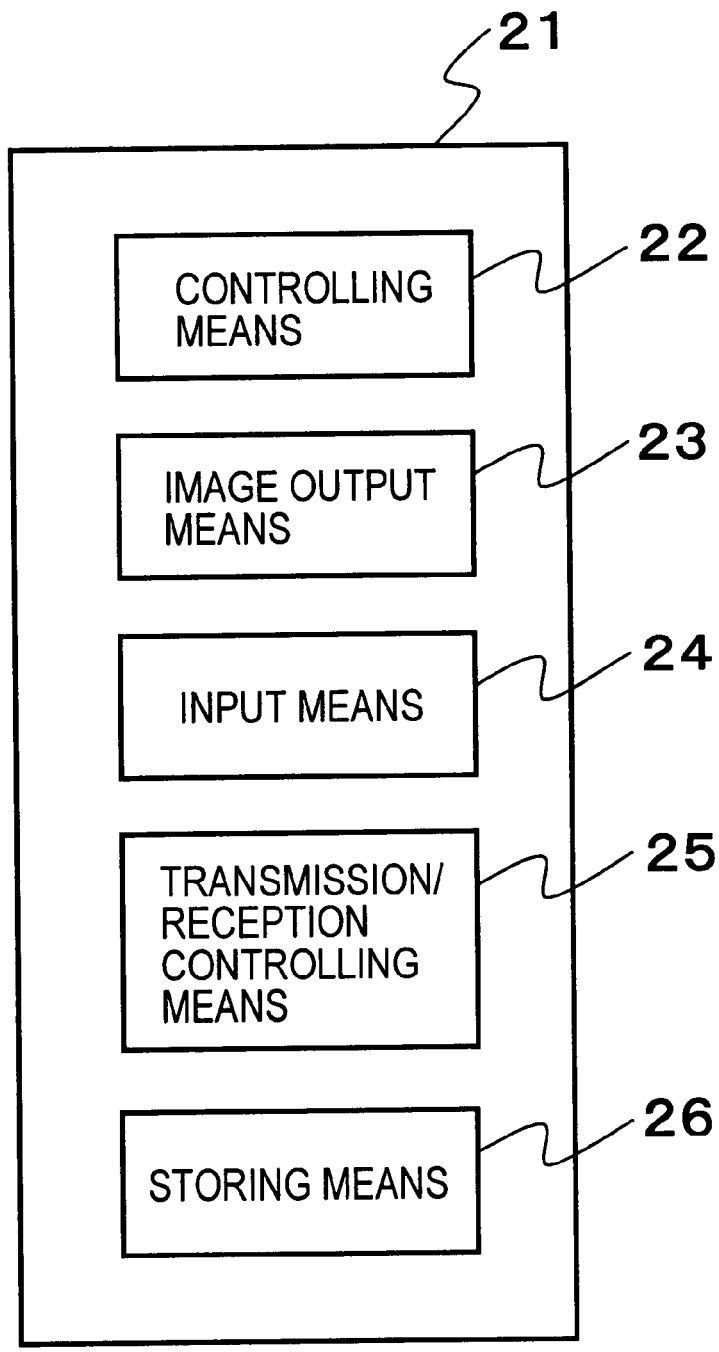
FIG. 4 is a block diagram showing an example of the functional structure of a terminal computer.

FIG. 4 is a block diagram showing an example of the functional structure of the terminal computer 21. The terminal computer 21 comprises controlling means 22, image output means 23, input means 24, transmission/reception controlling means 25, and storing means 26. Further, it may be provided with printing means, data output means, and the like.

The controlling means 22 is formed by a CPU and the like and it controls the respective means of the terminal computer 21, and the like. The image output means 23 performs the processing of displaying an image on the monitor 60. The input means 24 is formed by a keyboard, a mouse, and the like and it accepts an instruction from an operator of the terminal computer 21. The transmission/reception controlling means 25 controls the transmission/reception of the data to/from the key information registration system 11. The storing means 26 is formed by a hard disk and the like, and it stores basic software (OS), application software (browser) for expanding the data received from the key information registration system 11 into images and displaying the images, and the like.

Next, an example of the registration processing of the key information according to the embodiment will be described by using the drawings.

Figure 5:
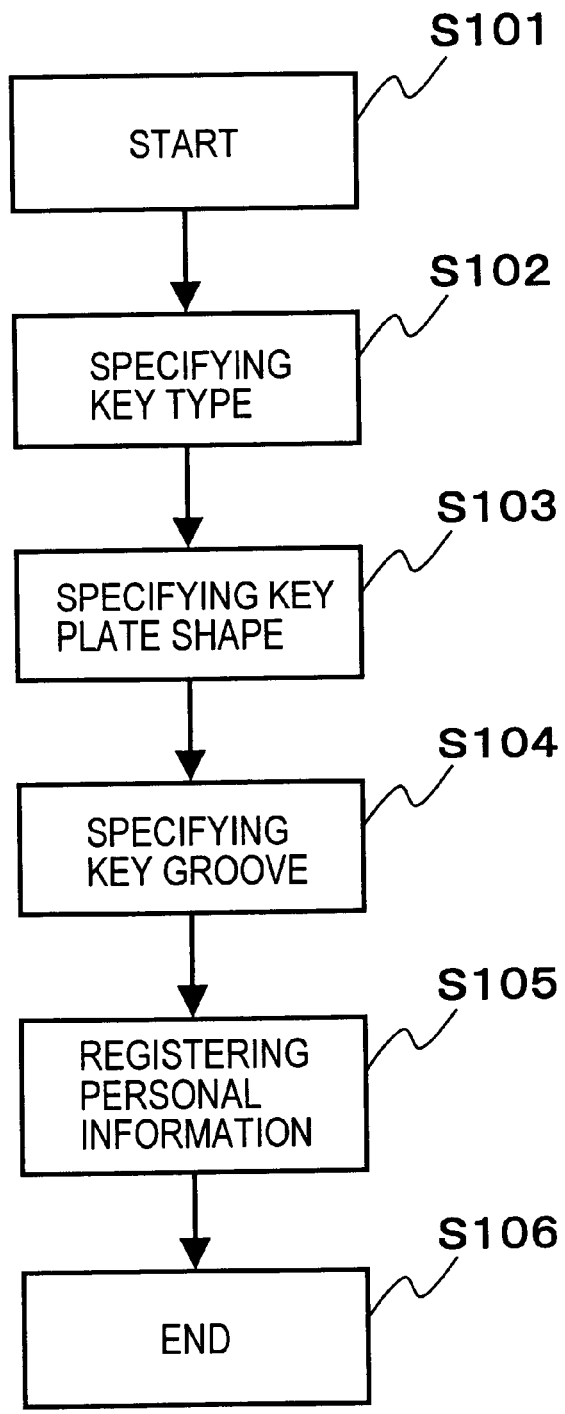
FIG. 5 is a flow chart for explaining the outline of registration procedure of key information.

FIG. 5 is a flow chart showing the outline of the registration processing of the key information.

Figure 6:
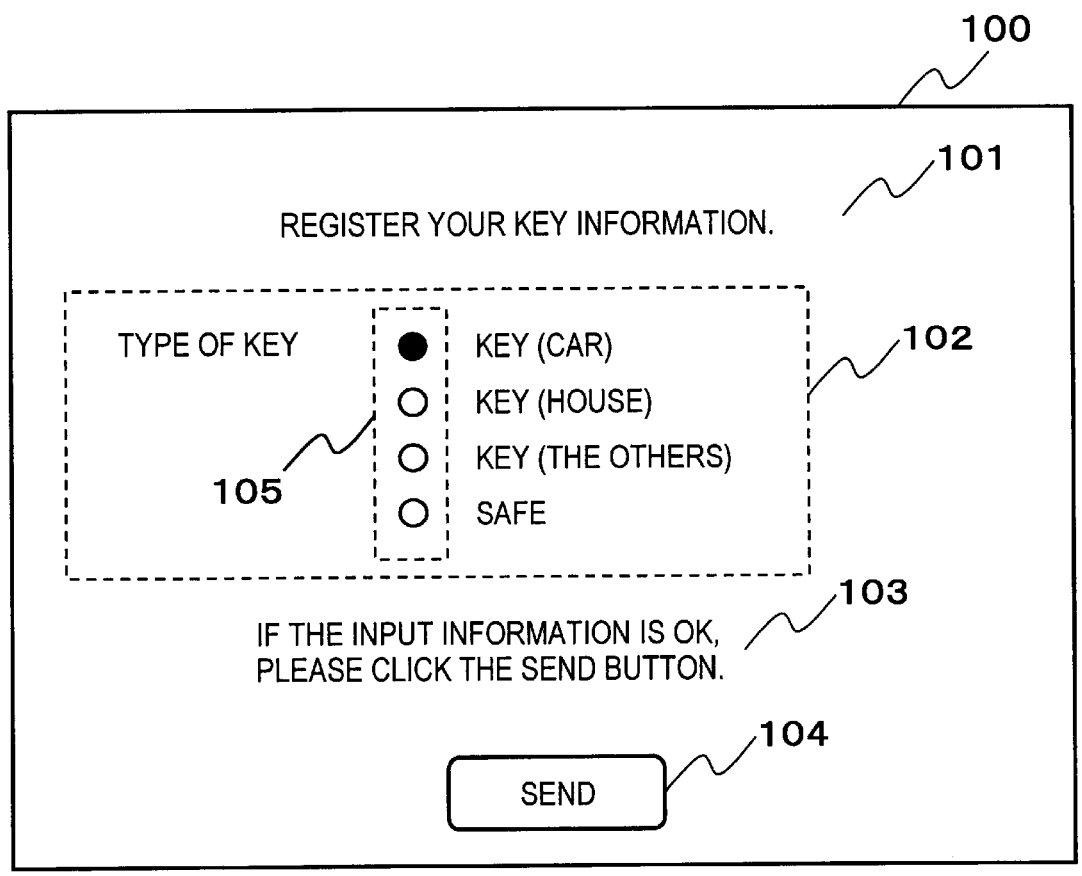
FIG. 6 is a view showing an example of key type specification page 100.

Upon receipt of a request for displaying a page concerned to the key information registration from the terminal computer 21, the key information registration system 11 displays a key type specification page 100, as shown in FIG. 6, on the monitor 60 of the terminal system 21 and performs the specification processing of the type of a key (S102).

All the Web pages described below show only one example and the present invention is not restricted to the structures of the Web pages shown as an example.

The key type specification page 100 includes a message 101 to the effect that the system registers the key information, a column 102 for displaying the type of the key a user registers, a message 103 to the effect that the system encourages a user to click the send button, and a "send" button 104 for sending the specified key type. As the types of the keys to be displayed, there are, for example, "key (car), key (house), key (the others), and safe". At the left side of each item, a button group 105 for accepting a user's click is arranged. A user can click a button corresponding to the type of a desired key with a mouse. When clicking a button, a user can confirm that the corresponding type of a key has been specified, for example, since the display color of the same button is changed. Upon receipt of the click of the "send" button 104, the key information registration system 11 stores the specified type of a key. When the type of a key to be registered is only one, this processing can be omitted.

Next, the key information registration system 11 performs the processing for specifying the shape of a key plate (S103). There are two methods of specifying the shape of a key plate in the present embodiment. Namely, one is a method of specifying a key plate from the maker of the key and the number carved on the key plate, and the other is a method of a user's selecting it by comparison between the actual key plate and a key plate image displayed on the monitor screen. A user can select either method.

Figure 7:
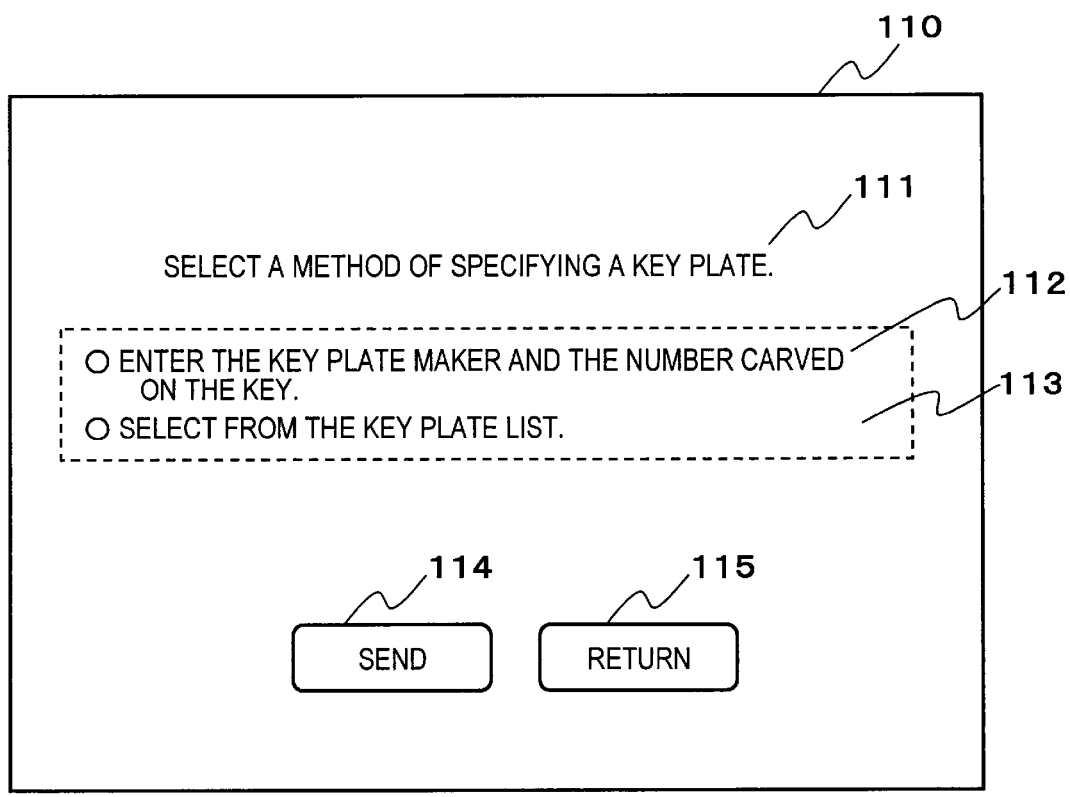
FIG. 7 is a view showing an example of a page for accepting a method of specifying a key plate.

Receiving the click of the "send" button 104 on the key type specification page 100, the key information registration system 11 displays a page 110 for accepting a specifying method of a key plate, as shown in FIG. 7, on the monitor 60 of the terminal computer 11. This page 110 includes a comment 111 to induce input of a specifying method of a key plate, "Enter the key plate maker and the number carved on the key" 112 and "Select from the key plate list" 113 as the alternatives, a "send" button 114 for sending the selected method, and a "return" button 115 for displaying the key type specification page 100 again. The key information registration system 11 waits for a user's input of instruction.

Figure 8:
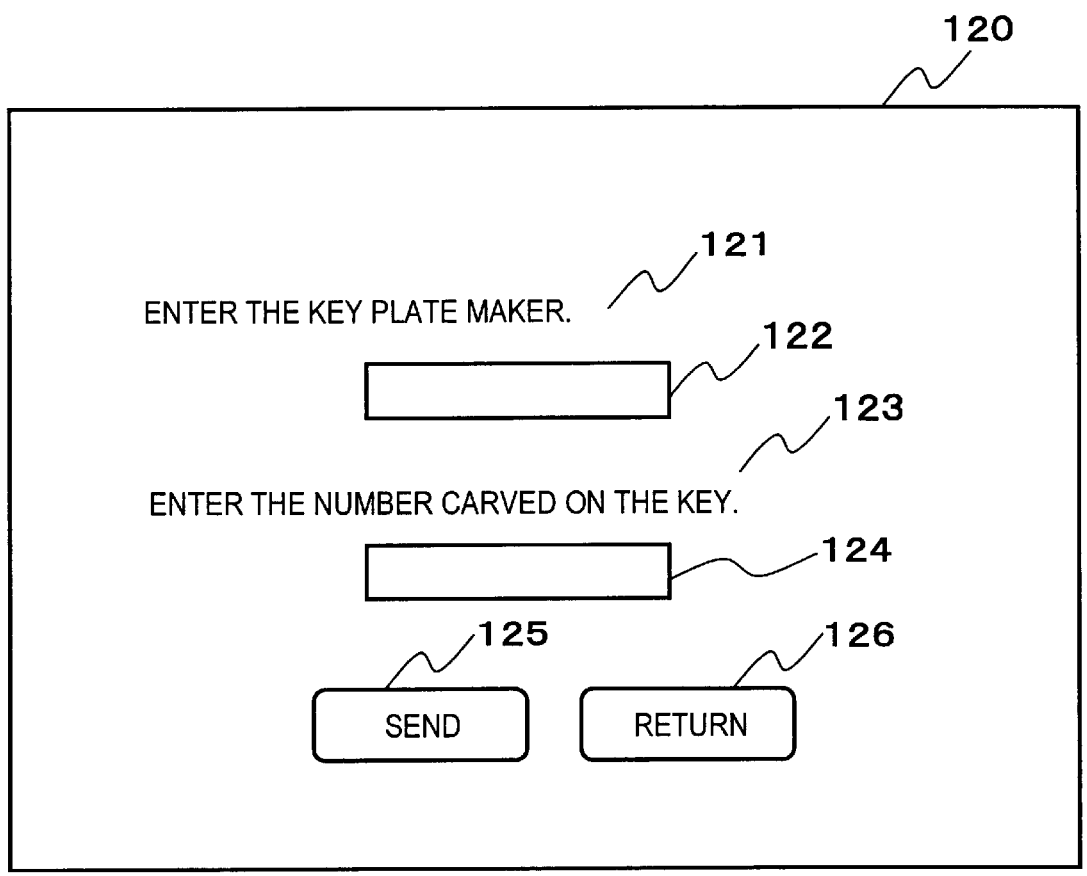
FIG. 8 is a view showing an example of a page for entering a key plate maker and number.

When accepting the instruction of "Enter the key plate maker and the number carved on the key" 112, the key information registration system 11 displays an input page 120 of the key plate maker and the number, as shown in FIG. 8. This page 120 includes a message 121 so as to induce input of the key plate maker, an input column 122, a message 123 to induce input of the number carved on the key, an input column 124, a "send" button 125, and a "return" button 126. A user can enter the maker of the key to be registered and the number carved on the key on this page 120.

Since the shape of the key plate can be specified from the key maker and the number carved on the key, the key information registration system 11 having received a user's input extracts the corresponding shape of the key plate, by using the key information managing means 15. Here, the data of the key plate shape handled by the key information registration system 11 is recorded and related to the key maker and the number carved on the key and stored in the key information managing means 15. Therefore, the shape of the key plate can be specified based on the information about the key maker and the number carved on the key which has been received from a user.

Figure 9:
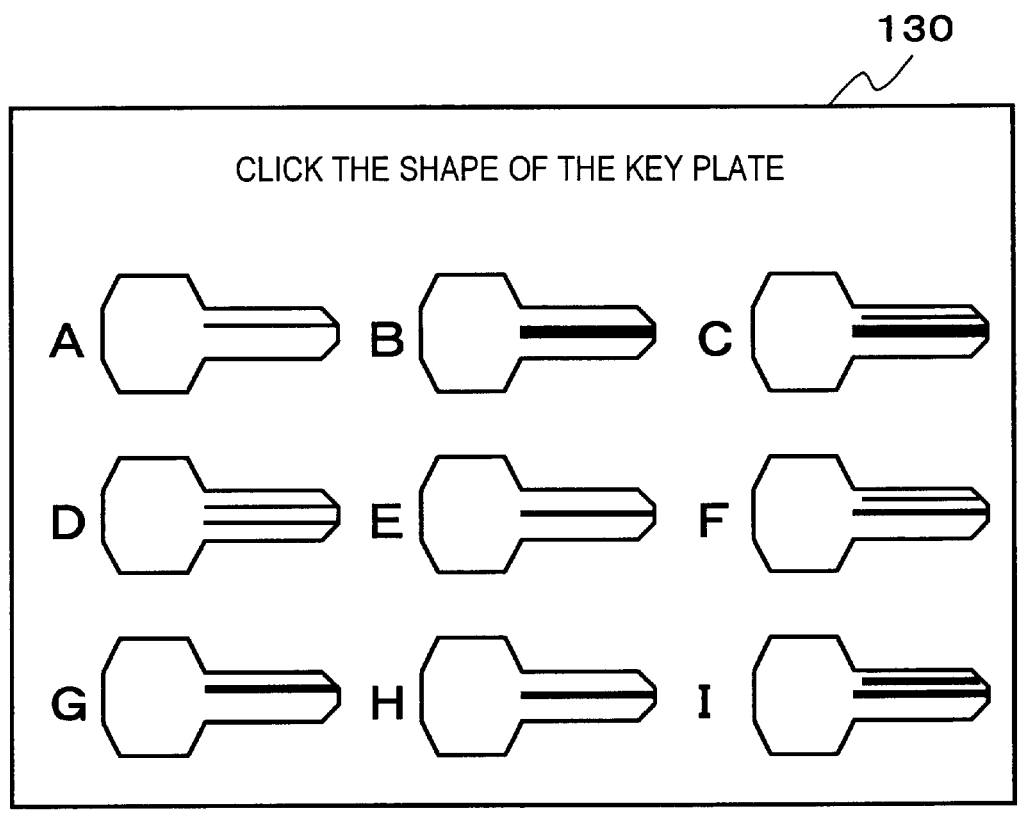
FIG. 9 is a view showing an example of a page of key plate list.

On the other hand, when accepting the instruction of "Select from the key plate list" 113, the key information registration system 11 displays a key plate list page 130, as shown in FIG. 9. On the key plate list page, the images of the key plate shapes registered in the key information managing means 15 is displayed.

A user can click the corresponding image of the key plate shape, by comparison between the actual key to be registered and the key plate list displayed on the monitor 60 of the terminal computer 11.

Upon receipt of the user's click operation, the key information registration system 11 defines the specified key plate shape image as the key plate shape to be registered.

Alternatively, on the key plate maker and number input page 120 shown in FIG. 8, in case of entering the key plate maker into the key plate maker input column 122 without entering anything into the input column 124 of the number carved on the key plate only the key plate images of the corresponding key maker may be displayed on the key plate list page 130 to accept a user's instruction.

As mentioned above, the key information registration system 11 can specify the key plate shape of the key a user wants to register. In the key information managing means of the key information registration system 11, the registered key plate shapes are encoded to be managed, and the key information registration system 11 holds the code of the specified key plate shape.

Next, the key information registration system 11 performs the specification accepting processing (S104) of a key groove.

Figure 10:
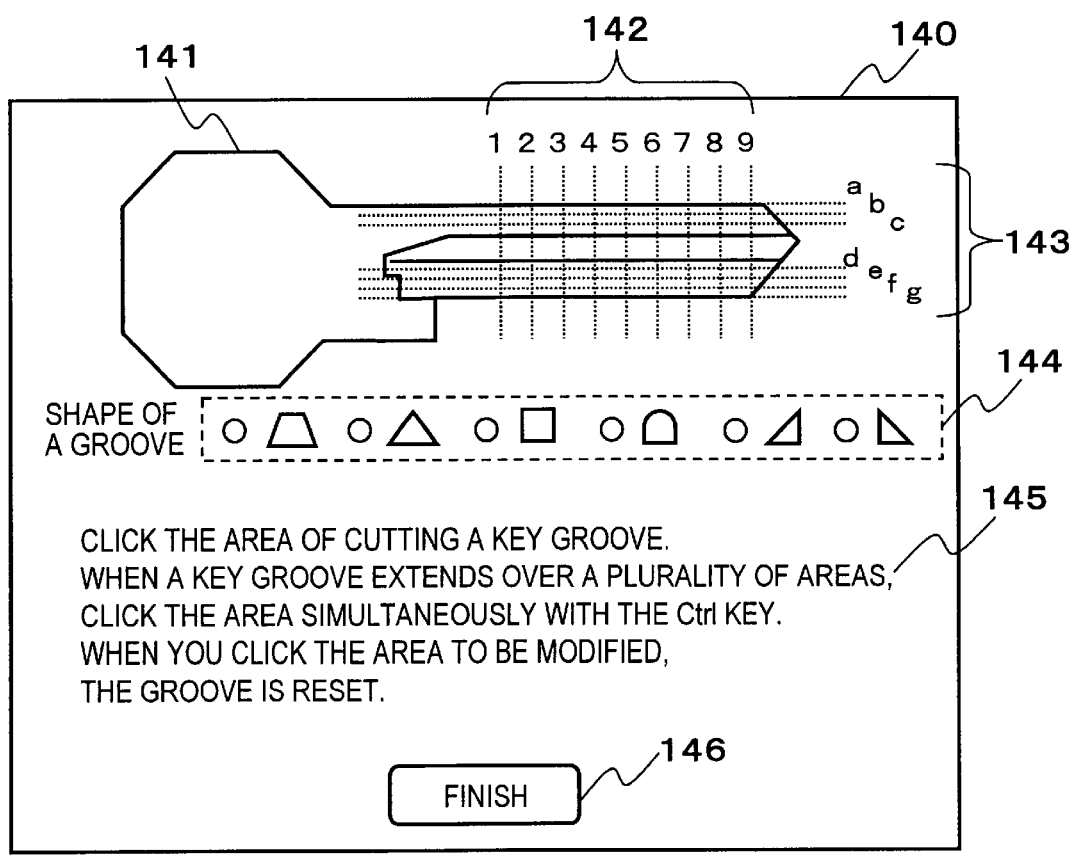
FIG. 10 is a view showing an example of a page for specifying a key groove.

The key information registration system 11 having specified the key plate shape displays a page 140 for specifying a key groove, as shown in FIG. 10, on the monitor 60 of the terminal computer 21.

The page 140 for specifying a key groove includes a key plate image 141, a guide line group 142 for specifying the position of cutting a key groove, a guide line group 143 for specifying the depth of a key groove, a button group 144 for specifying the shape of a key groove, a column 145 of describing how to use this page, and a "finish" button 146 for finishing the specification.

The key plate shape of the key plate image 141 is an image of the key plate shape specified by the key plate shape specification processing (S103). This is obtained by extracting the key plate image corresponding to the code of the specified key plate shape, from the key plate shape images registered in the key information managing means 15.

The guide line group 142 for specifying the position of cutting a key groove is formed by nine dotted lines in the example of this figure, where the numerals 1 to 9 are respectively attached. The position of a key groove can be specified by defining the divided space by the adjacent guide lines as a unit.

The guide line group 143 for specifying the depth of a key groove is formed by a total of seven dotted lines including three in the upper portion and four in the lower portion in the example of this figure, where the reference marks a to g are respectively attached. The depth of a key groove can be specified by defining the divided space by the adjacent guide lines as a unit. However, it is impossible to join a key groove on the upper portion and a key groove on the lower portion.

Namely, the area where a key groove is cut can be specified by the position and the depth, with the zone divided by the vertical and horizontal guide lines fixed as the unit.

As for the guide line groups 142 and 143, the guide lines for the number corresponding to the specified key type and key plate are displayed at each predetermined position. This information is stored in the key information managing means 15 together with the key plate and the like, and the guide line groups 142 and 143 are displayed corresponding to the displayed key plate image.

A user can select the shape of a groove to be specified from the button group 144 for specifying the shape of a key groove. Then, a user can click the area of cutting the key groove (the area surrounded by the guide lines) with a mouse. The area of cutting the key groove can be specified by the depth (combination of a to g) and the position (combination of 1 to 9) corresponding to the place where a user clicks. Further, a user can specify a key groove extending over a plurality of areas, for example, by clicking there while pressing the Ctrl key of the keyboard.

Figure 11:
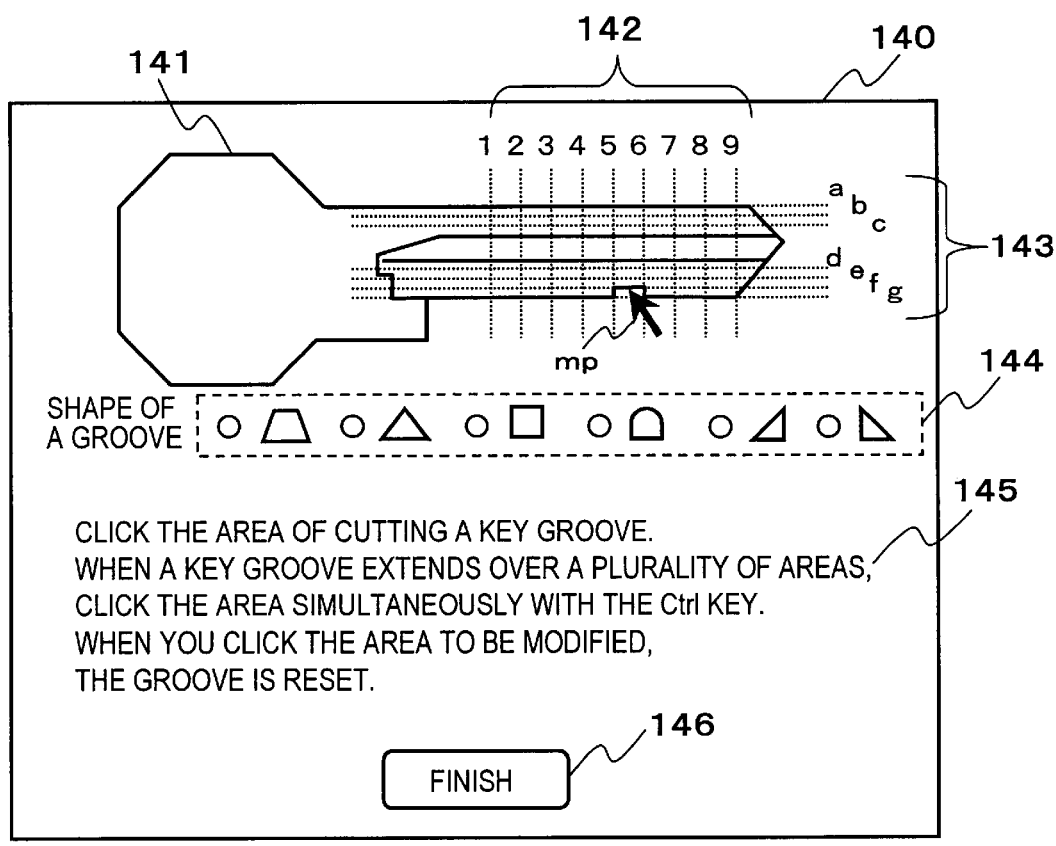
FIG. 11 is a view showing an example of a page for specifying a key groove.
Figure 12:
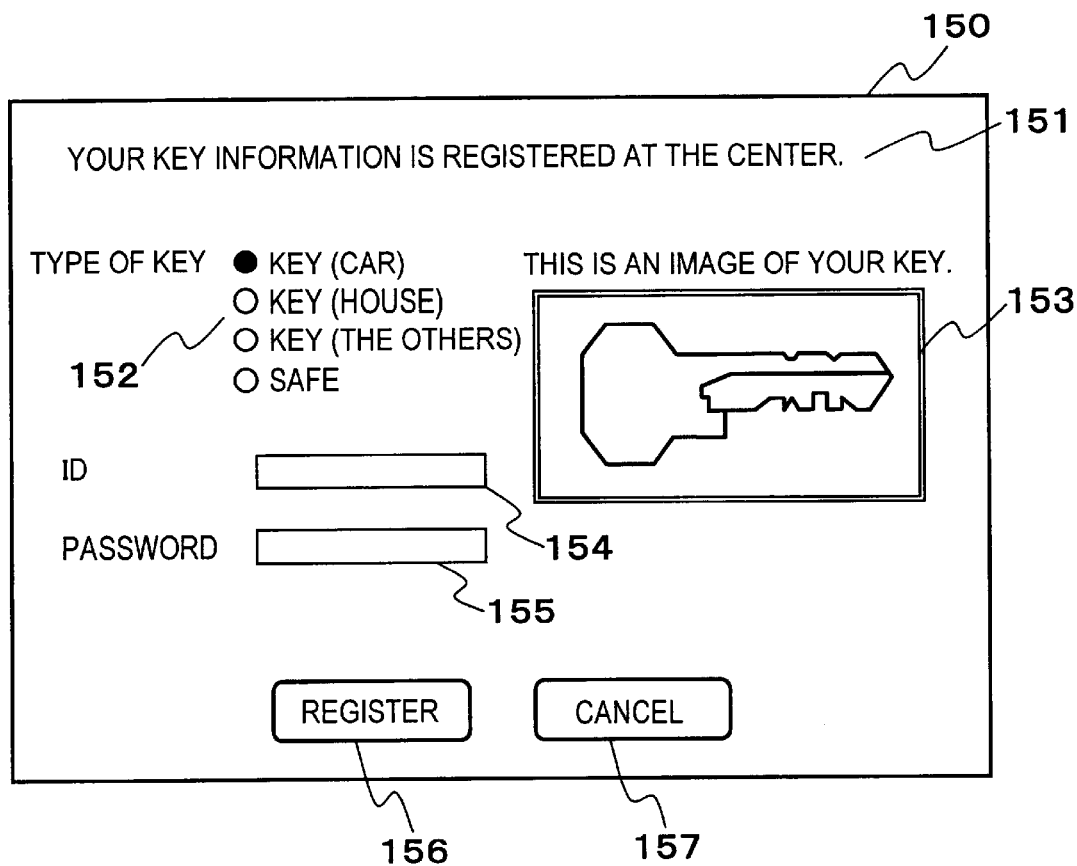
FIG. 12 is a view showing an example of a page for key information registration.

The Web page controlling means of the key information registration system 11 accepts a user's click operation and sequentially displays the shape of a key after the corresponding area is cut away, as illustrated in FIG. 11. FIG. 11 shows the case where the shape of a key groove is specified, a mouse pointer mp indicates the position 5-6 and the depth g-f, and a click operation is accepted. As a result of this operation, the key information registration system 11 displays the key plate image 141 where a key groove □ is cut at the corresponding area. When it accepts a click operation again in the same cut area, the key groove is reset and the key plate image of the reset state is displayed.

Thus, a user can form the shape of a key to be registered while confirming it on the screen, through the repeated operation of specifying the shape of a key groove and clicking the area to be cut. By clicking the finish button 146, this processing can be finished.

The specification of a key groove is not restricted to the above method. For example, an image of a groove shape may be displayed and by dragging this image to the area where a user wants to cut a key groove, the shape and the position of a groove may be specified. Alternatively, keys of a keyboard may be related to the key groove shape, position, depth, and the like, and key information may be specified by a key input from the keyboard 58 of the terminal computer 21.

Upon receipt of the "finish" button 146 on the page 140 for specifying a key groove, the key information registration system 11 displays the key information registration page 150 and performs the personal information registration processing (SLOS). The personal information registration processing (SLOS) may be performed prior to the accepting processing of the key information (S102 to S104).

The personal information registration page 150 includes a message 151 to induce registration, a column 152 for displaying the type of a key to be registered, an image 153 of a key to be registered, an ID input column 154, a password input column 155, a "registration" button 156 for accepting registration, and a "cancel" button 157 for accepting cancel.

Upon receipt of a click of the "registration" button 156, the key information registration system 11 relates the ID entered by a user and the password to the key information and registers the above by using the user information managing means 14.

At this time, the key information can be encoded. For example, when trapezoid is brought into correspondence with "α", triangle is brought into correspondence with "β", rectangle is brought into correspondence with "γ", and so on, the code corresponding to some key groove may be represented by "α12ab". This means a key groove having the groove shape of trapezoid, the position of 1-2, and the depth of a-b. By this format, all the grooves belonging to a key can be represented.

The ID and the password are used for specifying a user who registered the key information, in relation to the key information. Thus, since it is not necessary for a user to register his or her own name, address, and the like, in registration of the key information, privacy can be protected and security can be ensured.

A user who registered the key information according to the key information registration system 11 can visit a key manufacturer who can use the key information registered according to the key information registration system 11, if necessary, or make contact with the key manufacturer by telephone and the like, and inform the ID and password he or she registered on the page 150. Then, the user information managing means 14 of the key information registration system 11 can extract the key information with the ID and password used as a keyword. The key manufacturer can make a key based on this information.

At this time, if the above-mentioned key information code and a cut instruction corresponding to it are previously stored into the key plate cutter as a set, a key can be automatically manufactured by the input of the key information code into the key plate cutter.

In the above embodiment, the description has been made in case of registration by use of the Web page in the terminal computer 21 connected to a network. The present invention, however, is not restricted to this case but it can be also applied to an information processor connected to no network.

In this case, the same screen as the above-mentioned Web page is created and controlled, and application software capable of accepting input from a user and a database capable of realizing the key information managing means 15 are installed into the information processor of the user. The user can enter the key information he or she wants to register there by using this system in the same procedure. Namely, the present invention can be realized by comprising at least display controlling means of image information, managing means of key information, and receiving means of a user's instruction.

In this case, registration processing is performed by printing the input information and sending the same, for example, by mail, facsimile, and the like, to a key information registration agency.

The above application software and database can be created easily by using a general purpose program development tool.

As mentioned above, according to the present invention, the registration procedure necessary to make a key can be performed easily.

What is claimed is:

1. A key information registration support system for supporting a registration procedure of key information necessary to make a key, comprising:

means for storing image data for key information input including an image indicating a shape of a key plate, an area display image indicating an area where a key groove concerned about the shape needs to be formed, and a key groove shape display image indicating a plurality of standard key groove shapes, used for specifying the shape of a key groove;

means for accepting an input of the key plate specification information for specifying a key plate;

means for retrieving the image data for key information input about the key plate specified by said the accepted key plate specification information;

means for supplying the image data for key information input found by said retrieval, and means for accepting an input of information including a specified key groove shape as indicated by the key groove shape display image and an input information including a specified area indicated by the area display image for the supplied image data for key information input.

2. The key information registration procedure support system, according to claim 1, wherein said area display image indicating the area where a key groove needs to be formed is an image for displaying information indicating position of the key groove and information indicating depth of cut of the key groove.

3. The key information registration procedure support system, according to claim 1, wherein said key plate specification information for specifying a key plate includes a key plate marker and number carved on a key.

4. The key information registration procedure support system, according to claim 1, further comprising:

means for supplying a plurality of image data indicating the shape of a key plate, and wherein instead of said means for accepting an input of the key plate specification information, the key information registration procedure support system further comprises:

means for accepting an input of information about the image data indicating a specified key plate shape for the supplied several plurality of image data.

5. The key information registration procedure support system, according to claim 1, further comprising:

means for accepting an input of information for specifying a user of the key information registration procedure support system, and means for storing the accepted information for specifying a user, in relation to the information including the specified key groove shape indicated by the key groove shape display image and the specified area indicated by the area display image.

6. The key information registration procedure support system, according to claim 5, wherein said information for specifying a user doesn't include information of a user's name and address.

7. A key information registration procedure support system for supporting a registration procedure through a network of key information necessary to make a key, comprising:

means for storing image data for key information input including an image indicating a shape of a key plate, an area display image indicating an area where a key groove shape needs to be formed, and a key groove shape display image indicating a plurality of standard key groove shapes, used for specifying the shape of the key groove;

means for accepting an input of the key plate specification information for specifying a key plate, from a terminal computer connected through the network;

means for retrieving the image data for key information input about a key plate specified by the accepted key plate specification information;

means for sending the image data for key information input found by the above retrieval, to the terminal computer connected through the network; and means for accepting an input of information including a specified key groove shape as indicated by the key groove shape display image and an image information including a specified area as indicated by the area display for the supplied image data, from the terminal computer connected through the network.

8. A program for making a computer perform:

processing for storing image data for key information input including an image indicating a shape of a key plate, an area display image indicating an area where a key groove shape needs to be formed, and a key groove shape display image indicating a plurality of standard key groove shapes, used for specifying the shape of the key groove;

processing for accepting an input of the key plate specification information for specifying a key plate;

processing for retrieving the image data for key information input about a key plate specified by the accepted key plate specification information;

processing for supplying the image data for key information input found by the above retrieval; and processing for accepting an input of information including a specified key groove shape as indicated by the key groove shape display image and an input information including a specified area as indicated by the area display image for the supplied image data for key information input.

* * * * *